US009419522B1

(12) United States Patent
Khaligh et al.

(10) Patent No.: US 9,419,522 B1
(45) Date of Patent: Aug. 16, 2016

(54) ZVS DC/DC CONVERTER FOR CONVERTING VOLTAGE BETWEEN A BATTERY AND A DC LINK IN A HYBRID ENERGY STORAGE SYSTEM AND METHOD THEREOF

(71) Applicants: Alireza Khaligh, Arlington, VA (US); Serkan Dusmez, College Park, MD (US)

(72) Inventors: Alireza Khaligh, Arlington, VA (US); Serkan Dusmez, College Park, MD (US)

(73) Assignee: University of Maryland, College Park, MD (US)

( * ) Notice: Subject to any disclaimer, the term of this patent is extended or adjusted under 35 U.S.C. 154(b) by 288 days.

(21) Appl. No.: 14/179,108

(22) Filed: Feb. 12, 2014

Related U.S. Application Data

(60) Provisional application No. 61/764,325, filed on Feb. 13, 2013.

(51) Int. Cl.
*H02M 3/158* (2006.01)
*H02M 1/14* (2006.01)

(52) U.S. Cl.
CPC ............... *H02M 3/158* (2013.01); *H02M 1/14* (2013.01)

(58) Field of Classification Search
CPC .... H02M 3/156; H02M 3/158; H02M 3/1582
USPC .................. 323/222, 271, 282, 351
See application file for complete search history.

(56) References Cited

U.S. PATENT DOCUMENTS

| 2007/0230228 | A1* | 10/2007 | Mao | H02M 3/156 363/89 |
| 2009/0237042 | A1* | 9/2009 | Glovinski | H02M 1/34 323/235 |
| 2010/0148739 | A1* | 6/2010 | Khaligh | H02M 3/1582 323/283 |
| 2015/0303815 | A1* | 10/2015 | Chen | H02M 3/158 363/21.04 |

* cited by examiner

*Primary Examiner* — Jeffrey Sterrett
(74) *Attorney, Agent, or Firm* — Rosenberg, Klein & Lee

(57) ABSTRACT

The bi-directional DC/DC converter has zero voltage switching (ZVS) soft switching capability resulting in a higher efficiency, and provides reduction of the switching losses due to higher switching frequencies. The capability of operation in higher frequencies results in reducing the size of passive components including inductance and capacitors. The subject DC/DC converter is capable of operating with three voltage levels in both power flow directions, thus providing flexibility in the voltage control and attaining lower inductor current ripple and lower switch voltage ratings. DC link capacitors are replaced with ultra capacitor banks split in two.

18 Claims, 13 Drawing Sheets

US 9,419,522 B1

ZVS DC/DC CONVERTER FOR CONVERTING VOLTAGE BETWEEN A BATTERY AND A DC LINK IN A HYBRID ENERGY STORAGE SYSTEM AND METHOD THEREOF

REFERENCE TO RELATED APPLICATIONS

This Utility Patent Application is based on a Provisional Patent Application No. 61/764,325 filed 13 Feb. 2013.

FIELD OF THE INVENTION

The present invention is directed to hybrid energy storage systems; and more in particular, to DC/DC converters serving as an interface between a battery and the DC drive link in Hybrid Energy Storage Systems.

In overall concept, the present invention directs itself to a bi-directional DC/DC converter for Hybrid Energy Storage Systems which has a high efficiency due to Zero-Voltage Switching (ZVS) soft switching in both power flow directions, and negligent inductor ripples.

The present invention also is directed to a Hybrid Energy Storage System using a DC/DC converter which is designed with a split ultracapacitor bank permitting elimination of the DC link capacitors.

Additionally, the present invention is directed to a DC/DC converter for a Hybrid Energy Storage System which provides an enhanced flexibility attained by operating with three voltage levels in both power flow directions.

BACKGROUND OF THE INVENTION

Electric vehicles are the vehicles propelled by electricity as opposed to the conventional vehicles which operate on fuels. Electric vehicles may use a combination of different energy sources such as for example, fuel cells (FCs), batteries, and super capacitors (or ultracapacitors) to power an electric drive system as shown in FIG. 1.

Electric vehicles (EVs) operate with higher energy conversion efficiency, produce a lower level of exhaust emissions, and lower levels of acoustic noise and vibration, than conventional vehicles.

The electricity needed tor Electric Vehicles operation can be produced either outside the vehicle and stored in a battery, or produced on-board with the help of fuel cells (FC's).

In EVs, the main energy source is assisted by one or more energy storage devices. Two often used energy storage devices are batteries and supercapacitors which can be connected to the fuel cell stack in many ways. The voltage characteristics of the two devices have to match perfectly, and only a fraction of the range of operation of the devices can be utilized, e.g., in a fuel cell/battery configuration, the fuel cell must provide almost the same power all the time due to the fixed voltage of the battery, and in a battery/super-capacitor configuration, only a fraction of the energy exchange capability of the supercapacitor (also referred to herein as ultracapacitor) can be used.

DC/DC converters can be used to interface the elements in the electric power train by both boosting or chopping the voltage levels as required by the load in different regimes of the EV operation. By introducing the DC/DC converters, one can choose the voltage variations of the devices, and the power of each device can be controlled.

Different configurations of EV power supplies dictate that at least one DC/DC converter is necessary to interface the FC, the battery, or the supercapacitor's module and the DC-link.

The DC/DC converter structure has to be reliable and light-weight, small in volume, operate with high efficiency and low EMI (electro-magnetic interference) and low current/voltage ripple.

A DC/DC converter is a category of power converters having an electric circuit which converts a source of direct current (DC) from one voltage level to another, by storing the input energy temporarily and subsequently releasing the energy to the output at a different voltage.

The storage of the input energy may be in either magnetic field storage components (inductors, transformers) or electric field storage components (capacitors). DC/DC converters can be designed to transfer power in only one direction, from the input to the output. However, almost all DC/DC converter topologies can be made bi-directional which can move power in either direction, which is useful in applications requiring regenerative braking.

The amount of power flow between the input and the output in the DC/DC converter can be controlled by adjusting the duty cycle which is identified as a ratio of on/off time of a switch in the DC/DC converter. Usually, this is done to control the output voltage, the input current, the output current, or to maintain a constant power.

A wide variety of DC/DC converter topologies have been developed. Some design considerations are essential in automotive applications for the DC/DC converters. These considerations include light weight, high efficiency, small volume, low intermagnetic interference, low current ripple drawn from the fuel cells or the battery, the step up function of the converter, and achieving control of the DC/DC converter power flow in the wide voltage variations on the converter input.

The most common DC/DC converters can be grouped in several categories:

Non-isolated converters which are generally used where the voltage needs to be stepped up or down by relatively small ratio (less than 4:1). There are five main types of converters in the non-isolated group, usually called the buck, boost, buck-boost, CUK, and charge-pump converters. The buck converters are used for voltage step down, while the boost converters are used for voltage step up. The buck-boost and CUK converters can be used for either step down or step up. The charge-pump converters are used for either voltage step up or voltage inversion, but only in relatively low power applications.

Another category of DC/DC converters includes isolated converters in which a high frequency transformer is used. These converters are useful in the applications where the output needs to be completely isolated from the input. All of these converters can be used as bi-directional converters with a high ratio of stepping down or stepping up the voltage. Transformer-based converters may provide isolation, between the input and the output.

Each converter topology has its advantages and its drawbacks. For example, the DC/DC boost converters may not meet the criteria of electrical isolation. Moreover, the large variance in magnitude between the input and the output may impose serious stresses on the switches in the converter. This topology also may suffer from high current and voltage ripples, and has a large volume and weight.

A basic interleaved multi-channel DC/DC converter topology permits reduction of the input and output current and voltage ripples, as well as reduction of the volume and weight of the inductors, and increase in the efficiency. This structure, however, cannot operate efficiently when a high voltage step-up ratio is required since the duty cycle is limited by the circuit impedance leading to a maximum step-up ratio of approximately 4. Hence, two series connected step-up converters would be required to achieve the specific voltage gain of the application specification.

A full-bridge DC/DC converter is the most frequently implemented circuit configuration for fuel cell power conditioning when electrical isolation is required. The full-bridge DC/DC converter is suitable for high-power transmission because switch voltage and current are not high. It has small input and output current voltage ripples. The full-bridge topology is a favorite for zero voltage switching (ZVS) pulse switch modulation (PSM) techniques. (Monzer Al Sakka, et al., "DC/DC converters for Electric Vehicles," Electric Vehicles-Modeling and simulations, Dr. Seref Soylu (Ed), ISBN: 978-953-307-477-1, In Tech, available from: http://www.intechopen.com/books/electric-vehicles-modelled-and-simultations/adc-dc-converters-for-electric-vehicles).

Fast semiconductor devices make it possible to have high speed and high frequency switching in power electronic converters. High speed switching helps to reduce weight of the components and volume of equipment. However, it causes some undesirable effects, such as, for example, the radio frequency interference ignition. It is believed that high $$\frac{dv}{dt} \text{ or } \frac{di}{dt}$$

due to the modern power device switching is mainly responsible for the EMI emissions.

Another drawback of DC/DC converters is the operation with considerable energy losses including the losses produced by the semiconductor switches (IGBTs and diodes) and the passive components (capacitors and inductors).

It is desirable to provide a DC/DC converter for Hybrid Energy Storage Systems with minimized switching losses, lower inductor current ripple and low switch voltage ratings, as well as to reduce the output voltage ripples, and to enhance reliability and autonomy of the Hybrid Energy Storage Systems operation.

SUMMARY OF THE INVENTION

It is therefore an object of the present invention to provide a bi-directional DC/DC converter for Hybrid Electric Vehicles, and in general for Hybrid Energy Storage Systems, having a topology supporting a high efficiency achieved due to (Zero-Voltage-Switching) ZVS soft switching capability.

It is another object of the present invention to provide a Zero-Voltage Switching bi-directional DC/DC converter utilizing a split ultra-capacitor bank as DC link capacitors to provide flexibility in outputting a required output voltage level.

It is also an object of the present invention to provide a Zero-Voltage Switching bi-directional DC/DC converter capable of operating with three voltage levels to provide an enhanced flexibility in control and attaining lower inductor current ripple and lower switch voltage ratings.

In one aspect, the present invention is directed to a DC/DC converter circuited for converting a voltage between a battery and a DC link in Hybrid Electric vehicles. The DC/DC converter in question includes main switches $S_1$, $S_2$, $S_3$, and $S_4$ coupled sequentially between opposite first and second terminals of a battery.

A first zero-voltage-switching (ZVS) circuit is coupled to the first terminal of the battery between the main switches $S_1$ and $S_2$ for soft switching these switches $S_1$ and $S_2$. A second zero-voltage-switching (ZVS) circuit is coupled to the second terminal of the battery between the main switches $S_3$ and $S_4$ for soft switching these switches $S_3$ and $S_4$. The main switches $S_2$ and $S_3$ are coupled each to the other.

In the subject DC/DC converter, a transfer inductor is coupled between the first terminal of the battery and the first ZVS circuit.

Preferably, an ultracapacitor bank at the output of the DC/DC converter is split in two bank capacitors, e.g., $UC_1$ and $UC_2$ functioning as the DC links capacitors. The bank capacitor $UC_1$ is connected between the main switch $S_1$ and the connection node of the main switches $S_2$ and $S_3$, while the bank capacitor $UC_2$ is coupled between the main switch $S_4$ and the connection node of the main switches $S_2$ and $S_3$.

A controller supplies control signals $V_{tri1}$ to the main switches $S_1$, and $S_2$, and control signals $V_{tri2}$ to the main switches $S_3$, and $S_4$ to control switching of respective ones of the main switches $S_1$-$S_4$ in a predetermined order depending on a required mode of operation.

The control signals $V_{tri1}$ and $V_{tri2}$ have 180° phase shift with respect each to the other.

The subject DC/DC converter operates bi-directionally in either a boost mode where the power flow is directed from the battery to the DC Link, or a buck mode of operation where the energy flow is directed from the DC Link to the battery.

In the boost mode of operation, the main switches $S_2$ and $S_3$ are pulse-width-modulated, and the main switches $S_1$ and $S_4$ are switched OFF. In the buck mode of operation, the main switches $S_1$ and $S_4$ are pulse-width modulated, and the main switches $S_2$, and $S_3$ are switched OFF.

The switching frequency of a corresponding one of the main switches $S_1$, $S_2$, $S_3$, $S_4$ is controlled in accordance with a period of a respective one of the control signals $V_{tri1}$ and $V_{tri2}$. The corresponding main switch is turned ON when a value of the duty cycle of the corresponding main switch exceeds the respective control signal $V_{tri1}$ or $V_{tri2}$. The turn-on time of the corresponding main switch is phase-shifted, resulting in an effective frequency (i.e., the frequency of the input and output currents) of the subject DC/DC converter twice as high as the switching frequency.

During the boost and buck modes of operation, the DC/DC converter operates through a repetition of a specific sequence of modes, including:

mode I, where the main switches $S_2$ and $S_3$ are switched ON;

mode II, where the main switch $S_2$ is switched ON, and the main switch $S_3$ is switched OFF;

mode III, where the main switch $S_2$ is switched OFF, and the main switch $S_3$ is switched ON; and mode IV, where the main switches $S_2$ and $S_3$ are switched OFF.

Depending on a duty cycle d of the DC/DC converter (d<0.5 or d>0.5), a predetermined sequence of the modes is provided by controlling the switching of the main switches $S_2$ and $S_3$ in the boost-mode of operation, and of the main switches $S_1$ and $S_4$ in the buck mode of operation.

Each of the first and second ZVS circuits includes a pair of coupled in sequence resonance inductors, and a resonance capacitor coupled in sequence with an auxiliary switch. The resonance inductors are coupled in parallel to the resonance capacitor and the auxiliary switch. The first and second ZVS circuits are active in the boost, as well as in the buck, modes of operation for soft switching of respective main switches to attain transitioning of the operation between respective modes. For example, the ZVS circuits are active in the boost mode of operation during soft switching of the main switches $S_2$ and $S_3$, respectively, to actuate switching from the mode IV to the mode II, when the duty cycle d<0.5. The first and second ZVS circuits are also active during the soft switching of the main switches $S_2$ and $S_3$, respectively, to actuate switching between the mode III and the mode I in the boost mode of operation, when the duty cycle d>0.5. In the buck mode of operation, the first and second ZVS cells are active during soft switching of the main switches $S_1$ and $S_4$, respectively, to actuate transitioning from the mode II to the mode IV when the duty cycle d>0.5, and from the mode I to the mode III when the duty cycle d<0.5.

The auxiliary switch in each ZVS circuit is switched ON under Zero-Current-Switched (ZCS), and turned OFF under ZVS.

In another aspect, the present invention is directed to a process of DC/DC converting of power in Hybrid Energy Storage Systems via the steps of:

forming and coupling a DC/DC converter between a battery and a DC Link, where the DC/DC is formed through the steps of:

coupling main switches $S_1$, $S_2$, $S_3$, $S_4$ each to the other between first and second opposite terminals of the battery, coupling a first Zero-Voltage-Switching (ZVS) circuit to the first terminal of the battery, between the main switches $S_1$ and $S_2$ and coupling a second Zero-Voltage Switching (ZVS) circuit to the second terminal of the battery between the main switches $S_3$ and $S_4$, connecting a transfer inductor between the first terminal of the battery and the first ZVS circuit, and coupling at an output of the DC/DC connector an ultracapacitor bank split into two bank capacitors $UC_1$ and $UC_2$, wherein the bank capacitor $UC_1$ is connected between the main switch $S_1$ and a connection node of the main switches $S_2$ and $S_3$, and wherein the bank capacitor $UC_2$ is connected between the main switch $S_4$ and the connection node of the main switches $S_2$ and $S_3$.

The method further proceeds through the steps of:

controlling the switching of respective of the main switches $S_1$, $S_2$, $S_3$, $S_4$ by supplying thereto control signals $V_{tri1}$ and $V_{tri2}$ in a predetermined order, thereby switching the DC/DC converter between required modes of operation.

The method further continues through the steps of operating the DC/DC converter bi-directionally in a boost mode of operation or in a buck mode of operation. In the boost mode of operation, the power flow is directed from the battery to the DC Link, and in the buck mode of operation, the power flow is directed from the DC Link to the battery.

Preferably, in the boost mode of operation, the method performs pulse-width-modulation of the main switches $S_2$ and $S_3$, in a predetermined fashion, and the switching OFF of the main switches $S_1$ and $S_4$. In the buck mode of operation, the method contemplates the switching OFF the main switches $S_2$ and $S_3$, and pulse-width-modulation of the main switches $S_1$ and $S_4$.

The method further proceeds through the steps of:

operating the DC/DC converter through repetition of a specific sequence of modes which include transitions between respective modes selected from a group including:

mode I, where the main switches $S_2$ and $S_3$ are switched ON;

mode II, where the main switch $S_2$ is switched ON, and the main switch $S_3$ is switched OFF;

mode III, where the main switch $S_2$ is switched OFF, and the main switch $S_3$ is switched ON; and mode IV, where the main switches $S_2$ and $S_3$ are switched OFF.

Depending on a duty cycle d of the DC/DC converter (d<0.5 or d>0.5), in the boost mode of operation the main switches $S_2$ and $S_3$ are switched in an order permitting to attain repetitions of a predetermined sequence of the modes. During the buck mode of operation, the main switches $S_1$ and $S_4$ are switched in a predetermined fashion to provide transitions between modes depending on the duty cycle. The first ZVS circuit operates for soft switching of either of the main switches $S_1$ or $S_2$. The second ZVS circuit operates for soft switching of either of the main switches $S_3$ or $S_4$.

In the present method, in the boost mode of operation, the first and second ZVS circuits are active during the switching of the main switches $S_2$ and $S_3$, respectively, to attain transition between the mode IV and the mode II, and during the switching of the main switches $S_2$ and $S_3$, respectively, to attain transition between modes IV-III, when the duty cycle d<0.5. The first and second ZVS circuits are also active during the soft switching of the main switches $S_2$ and $S_3$, respectively, to attain transition between the mode III and the mode I, and during the switching of the main switches $S_2$ and $S_3$, respectively, to attain transition between modes II-I, when the duty cycle d>0.5. The first and second ZVS circuits are also active in the buck mode of operation for switching the main switches $S_1$ and $S_4$ as follows: when d>0.5, switching the main switches to attain transition between modes III-IV, and switching main switches to attain transition between modes II-IV, and when d<0.5, switching the main switches to attain transition between modes I-II, and switching the main switches to attain transition between modes I-III.

These and other objects and advantages of the present invention will be apparent from the description of preferred embodiments taken in conjunction with the Patent Drawings.

BRIEF DESCRIPTION OF THE DRAWINGS

FIG. 2A is a topology of the bi-directional ZVS three-level buck/boost DC/DC converter operational in a boost mode, FIG. 2B is a topology of the bi-directional ZVS three-level buck/boost DC/DC converter operational in a buck mode;

DETAILED DESCRIPTION OF THE PREFERRED EMBODIMENT

Figure 2A:
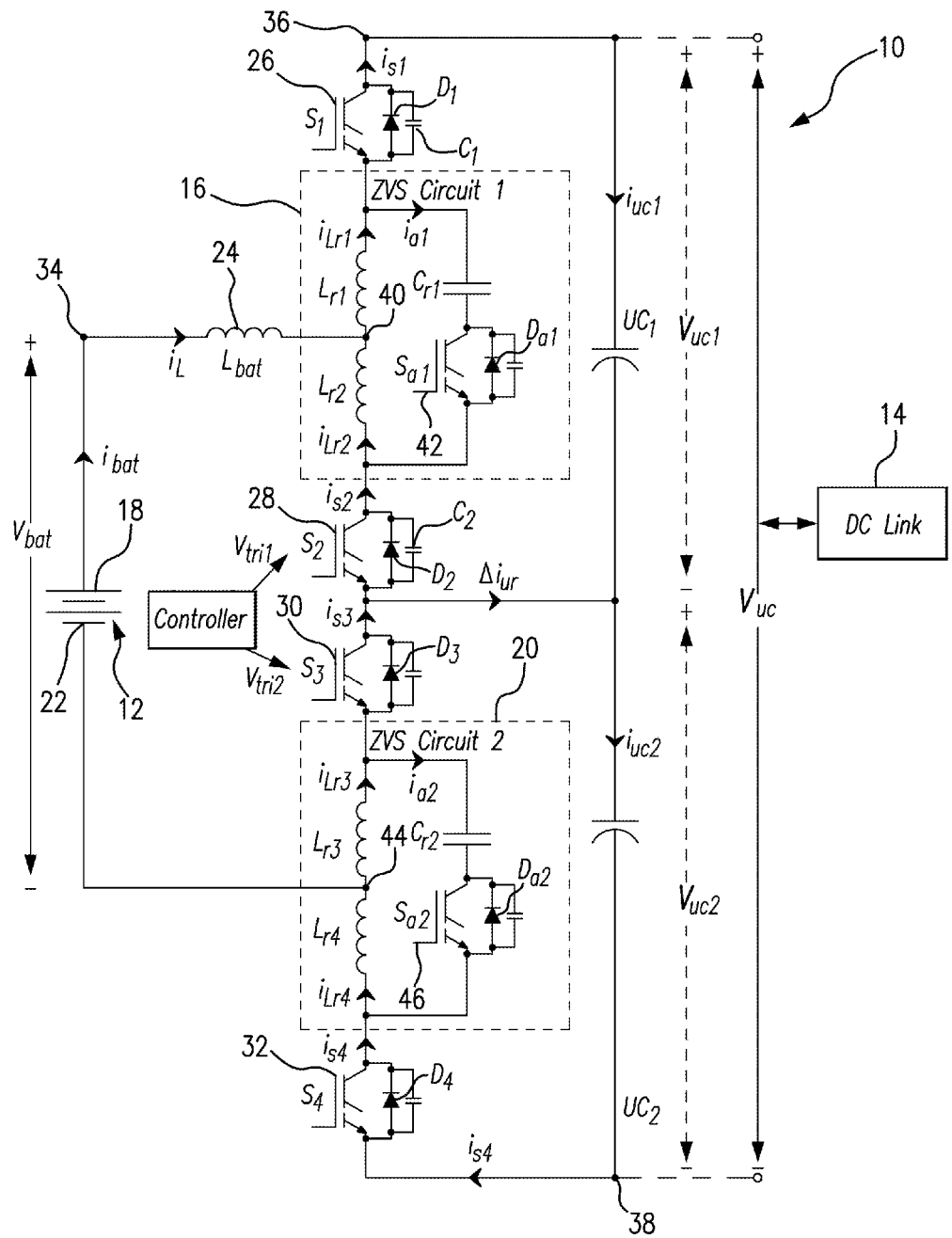
FIGS. 2A and 2B are each a topology of the bi-directional ZVS three-level buck/boost DC/DC converter of the present invention.
Figure 2B:
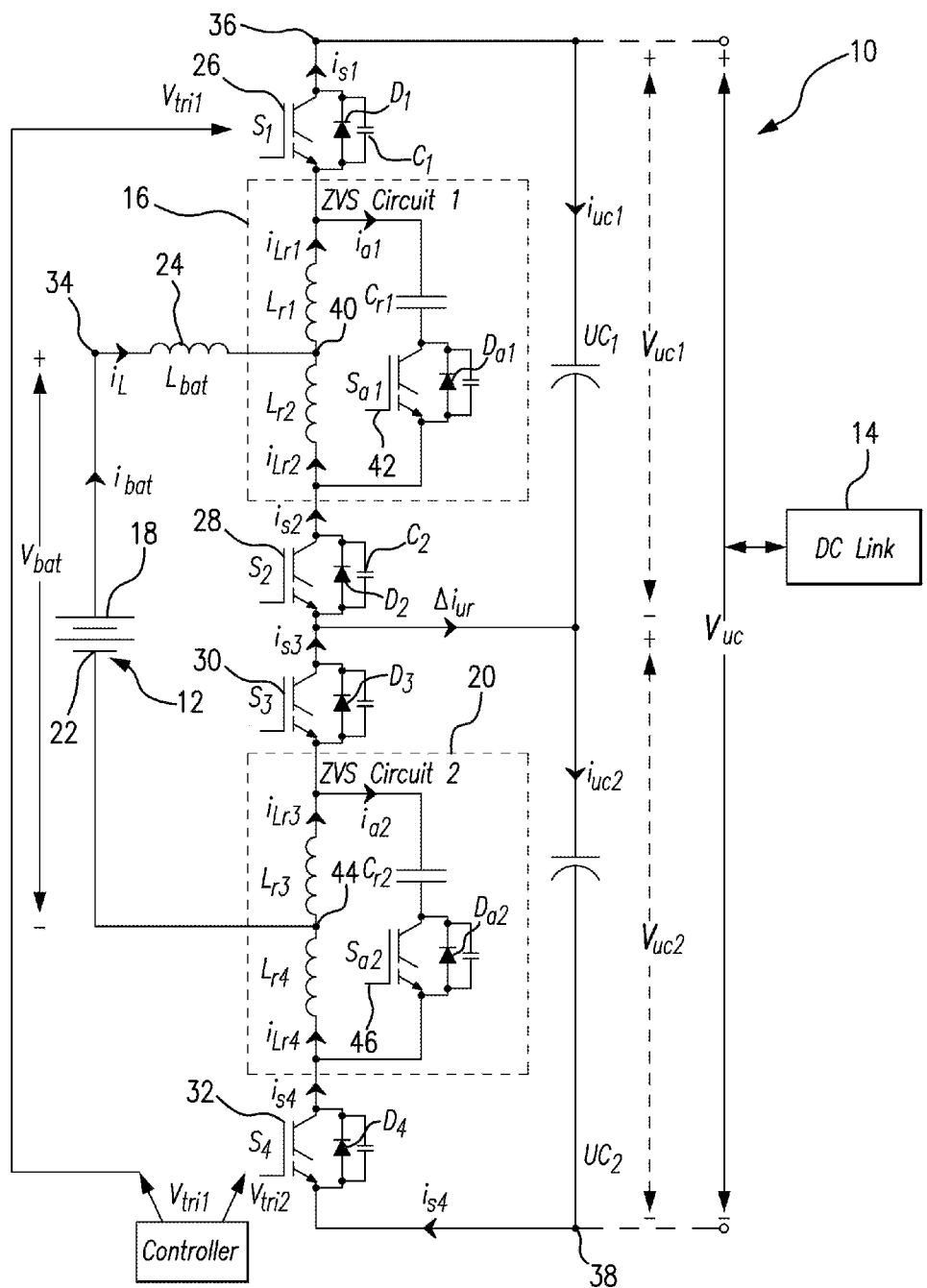

As shown in FIGS. 2A and 2B, the bi-directional ZVS (zero-voltage switching) DC/DC converter 10 is interconnected between a battery 12 and a DC link 14 in an Electric Vehicle drive system.

Figure 1:
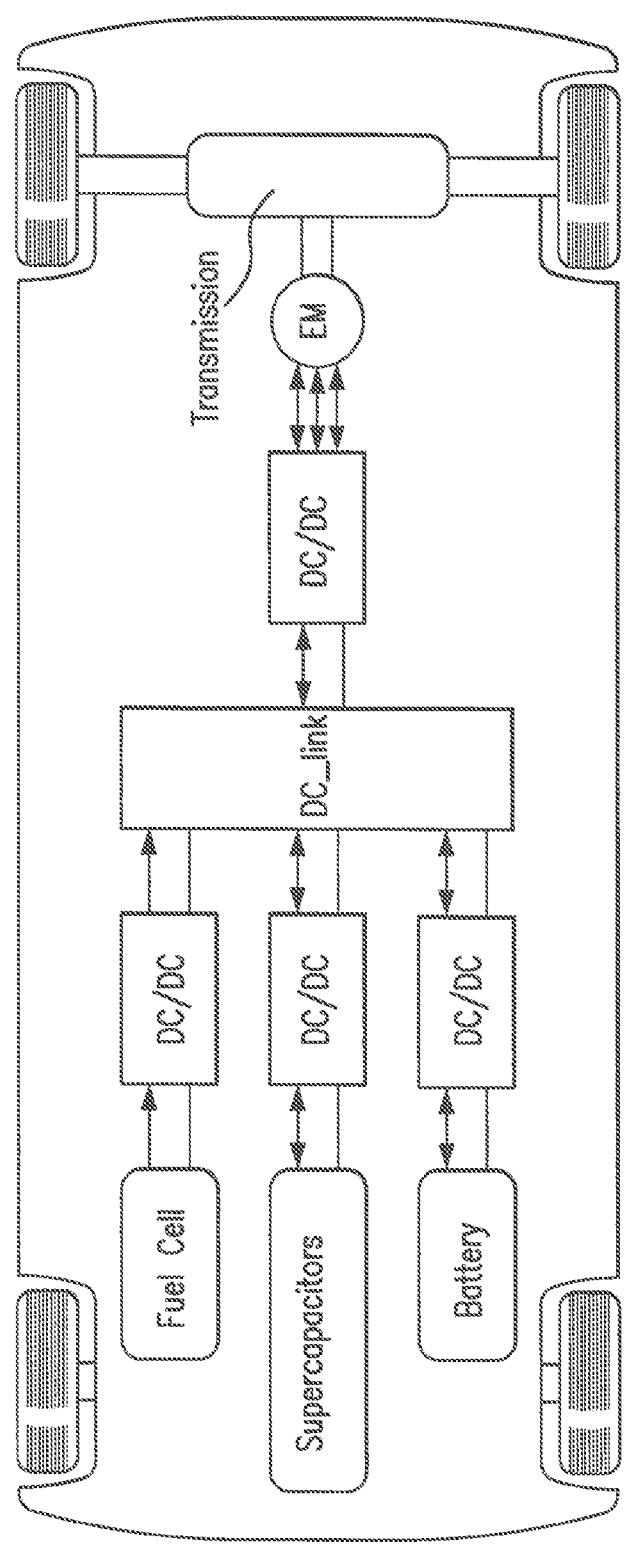
FIG. 1 is a schematic representation of the electric vehicle drive system of the prior art.

The DC/DC converter 10 includes a ZVS circuit 16 coupled to a terminal 18 of the battery 12, and a ZVS circuit 20 coupled to the terminal 22 of the battery 12. As shown in FIG. 1, the ZVS circuit 16 is coupled to the terminal 18 of the battery through a transfer inductor 24.

The DC/DC converter 10 further includes four main switches including switch $S_1$, switch $S_2$, switch $S_3$, and switch $S_4$. Switches $S_1$-$S_4$, are built with a solid state element, for example, respective Insulated-Gate Bipolar Transistors (IGBTs) 26, 28, 30 and 32, each of which has a respective intrinsic diode ($D_1$, $D_2$, $D_3$, or $D_4$,) which are body diodes of IGBTs.

The main switch S1 is connected to the node 34 (at the terminal 18 of the battery 12).

The main switches $S_2$ and $S_3$ are coupled in series between the ZVS circuit 16 and the ZVS circuit 20. The collector of the main switch $S_4$ is connected to the ZVS circuit 20, and the emitter of the main switch $S_1$ is coupled to the ZVS circuit 16.

Two split DC link capacitors $UC_1$ and $UC_2$ are connected in series each to the other, and both $UC_1$ and $UC_2$ are connected in parallel between the nodes 36 and 38, at the collector of the main switch $S_1$, and at the emitter of the main switch $S_4$, respectively.

The ZVS circuit 16 includes two small size resonance inductors $L_{r1}$, $L_{r2}$ coupled at the node 40 to the transfer inductor 24 opposite to the node 34. A resonant capacitor $C_{r1}$ and an auxiliary switch $S_{a1}$ are connected in series and together in parallel to the resonance inductors $L_{r1}$ and $L_{r2}$. Similar to the main switches $S_1$-$S_4$, the auxiliary switch $S_{a1}$ may be based on an IGBT 42. The IGBT 42 has an intrinsic body diode $D_{a1}$.

Similar to the ZVS circuit 16, the ZVS circuit 20 includes two small size resonance inductors $L_{r3}$ and $L_{r4}$ coupled by their interconnection node 44 to the terminal 22 of the battery 12. The resonance inductors $L_{r3}$ and $L_{r4}$ are connected in series each to the other, and together are connected in parallel to the resonant capacitor $C_{r2}$ and the auxiliary switch $S_{a2}$. Similar to the auxiliary switch $S_{a1}$, the auxiliary switch $S_{a2}$ may be based on an IGBT 46 which has an intrinsic body diode $D_{a2}$.

The ZVS circuit 16 and ZVS circuit 20 are utilized to eliminate the turn-on switching losses of the main switches S1-S4 in all operation modes.

The auxiliary switches $S_{a1}$ and $S_{a2}$ are turned ON with ZCS (zero-current-switching) and turned OFF with ZVS (zero-voltage-switching). Therefore, there are negligent (or zero) additional switching losses attributed to the auxiliary switches in the circuitry of the current DC/DC convener 10.

Basic Operation Modes of the Bi-directional ZVS Converter 10

The major operation modes of the subject DC/DC converter 10 include a boost mode taking place when the power flow is directed from the battery 12 to the DC link 14, and a buck mode when the energy flow is directed from the DC Link 14 to the battery 12.

The DC/DC converter 10 operates with three voltage levels which indicate the ones applied to the inductor 24. The three output voltage levels include the voltage level $V_{uc}$, the voltage level $V_{uc1}=V_{uc2}=V_{uc}/2$, and voltage level of 0V. Therefore, the inductor voltage can be $V_{in}$ (also referred to herein as $V_{bat}$), $V_{in}-V_{uc/2}$, and $V_{in}-V_{uc}$. For the balanced system, $V_{uc1}=V_{uc2}$. Each mode of operation includes several equivalent circuits due to different switching combinations. Depending on the operation mode, only two main switches are ON, while the other two main switches are always turned OFF.

In the boost mode of operation, main switches $S_2$ and $S_3$ are pulse-width-modulated, while the main switches $S_1$ and $S_4$ are kept at the OFF state. Oppositely, in the buck mode of operation, the switches $S_1$ and $S_4$ are Pulse-Width-Modulated (PWM), while the main switching $S_2$ and $S_3$ are OFF.

Figures 4A, 4B:
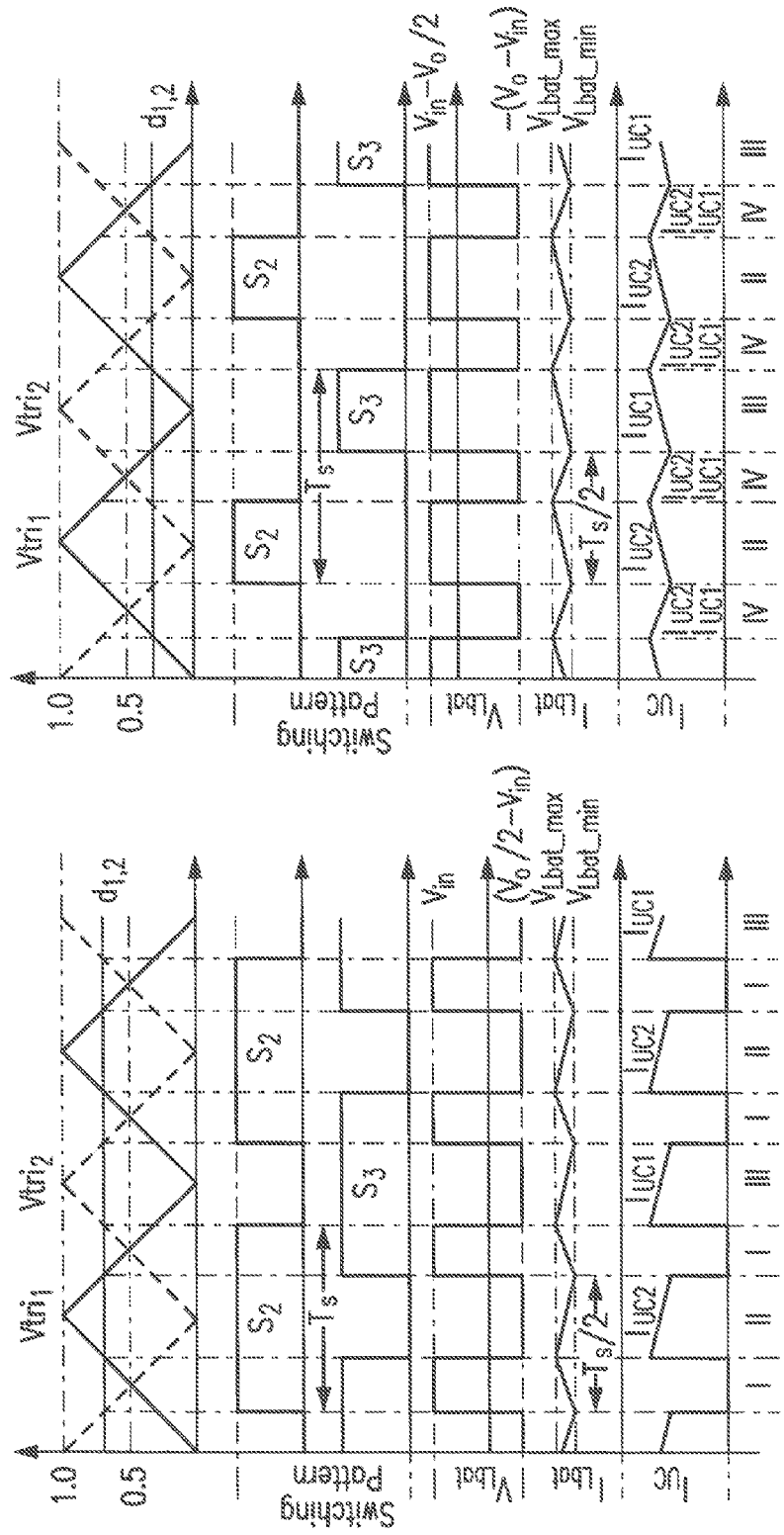
FIGS. 4A-4B are diagrams representative of the operation waveforms and the sequences of modes during the boost operation with d>0.5 (FIG. 4A) and d<0.5 (FIG. 4B)
Figure 5:
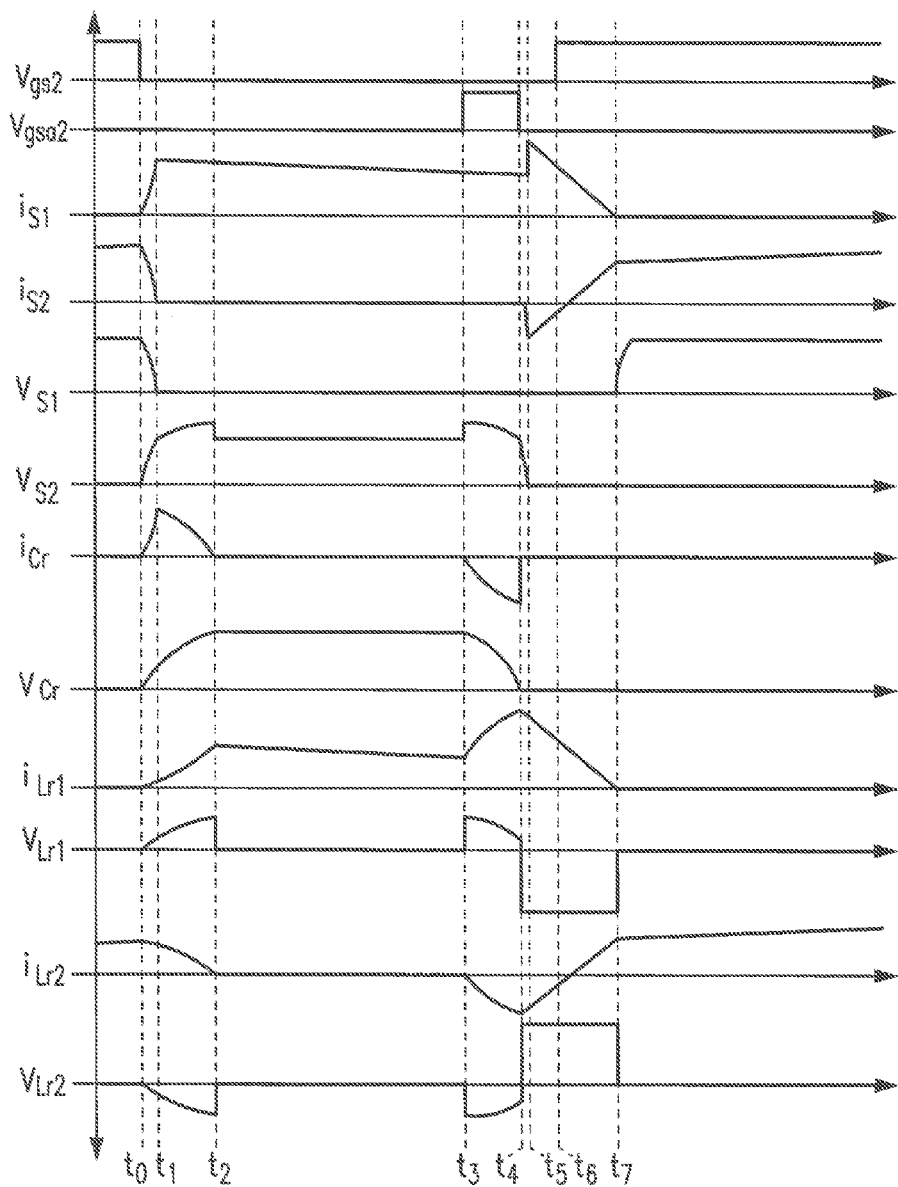
FIG. 5 is a diagram representative of the circuit waveforms for ZVS operation during mode transitions I-III-I in boost mode of operation of the subject DC/DC converter in different operation intervals.

The switching scheme of the boost and buck modes of operation are similar to each other in the sense that the same duty cycle is used for a selected main switch pair ($S_2/S_3$ in the boost mode or $S_1/S_4$ in the buck mode) in which the main switches are controlled with two signals, for example triangle control signals, $V_{tri1}$ and $V_{tri2}$ which, as shown in FIGS. 4A-4B, have 180° phase shift.

The triangle signal $V_{tri1}$ is the reference signal used for creating the gate pulses for either $S_1$ or $S_2$ depending on the operation mode. $V_{tri2}$ is the reference triangle signal which is used for creating the gate pulses for either of the main switches $S_3$ or $S_4$.

The periods of the triangle signals $V_{tri1}$ and $V_{tri2}$ determine the switching frequency for the related switches. When the value of the duty cycle d is higher than the value of the triangle signal $V_{tri1}$ or $V_{tri2}$, a corresponding main switch is turned ON. Thus, the switch turn-on time is phase-shifted, resulting in an effective output frequency (the frequency of the input and output currents) which is twice as high as the switching frequency, as will be presented infra with regard to FIGS. 4A-4B.

As an example only, but not to limit the scope of the present invention to a single mode of operation, the operation modes of the current DC/DC converter 10 will be detailed with reference to the boost mode of operation. The equivalent circuits in the buck mode are substantially similar to the equivalent circuits achieved during the boost mode of operation.

In the boost mode of operation, the main switches $S_1$ and $S_4$ are always kept at the OFF state, where the switching state combinations of the main switches $S_2$ and $S_3$ form different equivalent circuits, which lake place in producing a predetermined sequence during the boost operation mode, as will be presented in further paragraphs.

Without considering the ZVS circuits 16, 20, which affect the circuit operation only during a short period of time (particularly, during the instances when a corresponding main switch coupled to the ZVS circuit is turned ON), the operation of the DC/DC converter may be divided into 4 modes presented in FIGS. 3A-3D.

Mode I

Figure 3A:
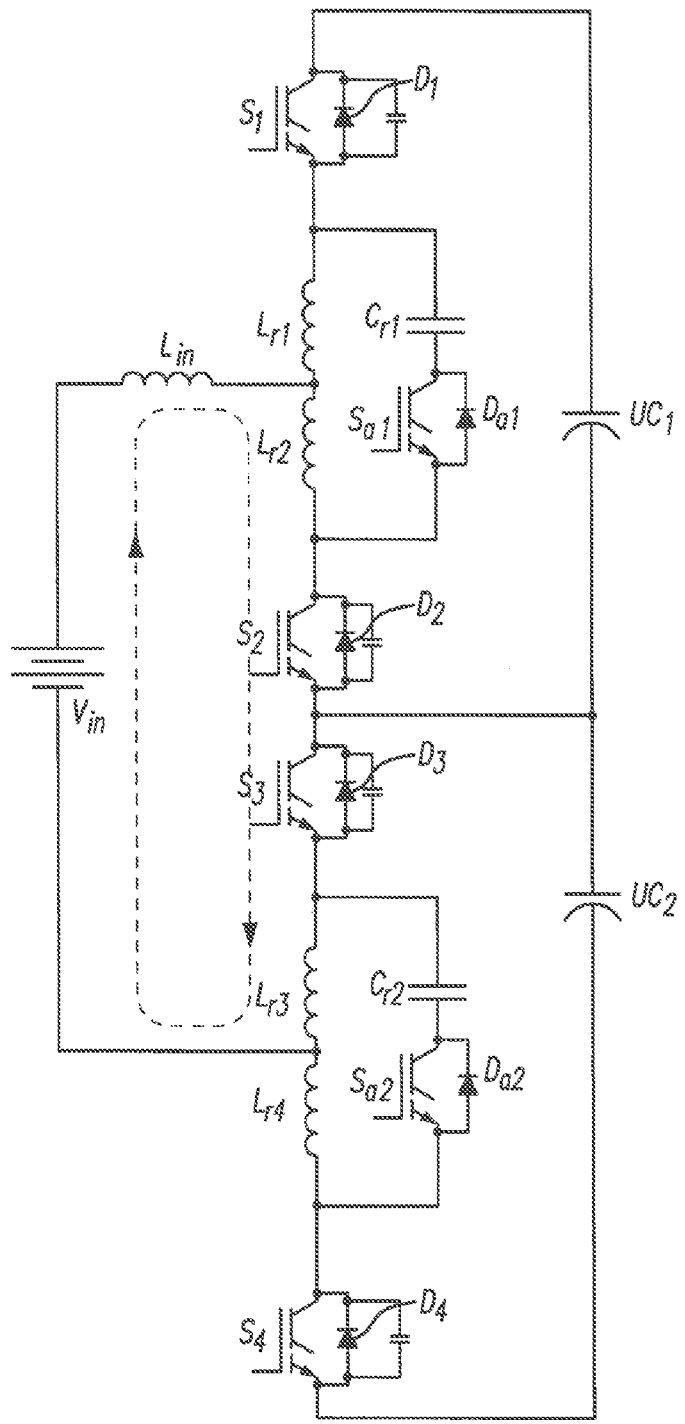
FIGS. 3A-3D are diagrams representing equivalent circuits of the converter during the boost operation with $S_2$ and $S_3$ ON (FIG. 3A), $S_2$ ON and $S_3$ OFF (FIG. 3B), $S_2$ OFF and $S_3$ ON (FIG. 3C), and $S_2$ and $S_3$ OFF (FIG. 3D)

The equivalent circuit for the interval of Mode I is shown in FIG. 3A. In this mode, both main switches $S_2$ and $S_3$ are ON (switches are closed). The transfer inductor 24, $L_{bat}$, (also referred to herein as $L_{in}$), stores energy with the battery voltage $V_{bat}$ across its terminals. Neglecting the internal resistances, the inductor current ripple can be expressed as $$\frac{di_L(t)}{dt} = \frac{V_{bat}(t)}{L_{bat}} \qquad \text{Eq. (1)}$$

Mode II

Figure 3B:
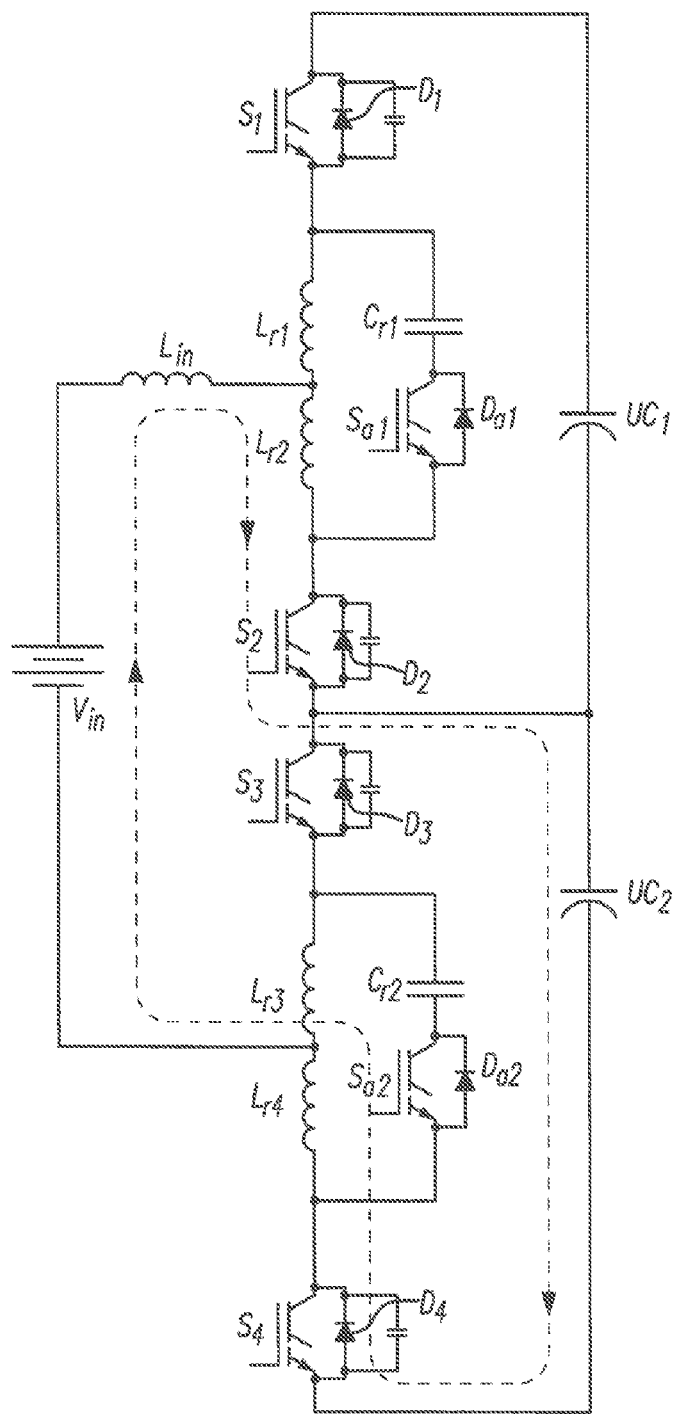

The equivalent circuit for the interval of the Mode II is illustrated in FIG. 3B. In Mode II, the main switch $S_2$ is ON, while the main switch $S_3$ is OFF. The body diode $D_4$ of the main switch $S_4$ is conducting, and the capacitor $UC_2$ is charged.

The inductor current $I_L$ may increase or decrease depending on the duty cycle value. When the duty cycle is 0.5, the battery voltage $V_{bat}$ ($V_{in}$) is equal to half of the UC bank voltage. Therefore, if the DC/DC converter 10 operates in the boost mode with a duty cycle d lower than 0.5, the voltage of the $UC_2$ will be higher than that battery voltage, and the conductor current will decrease. On the other hand, if the duty cycle is higher than 0.5, the voltage of $UC_2$ will be lower than battery voltage, and the inductor current $I_L$ will increase. Inductor current ripple can be generally expressed as $$\frac{di_L(t)}{dt} = \frac{V_{bat}(t) - V_{UC2}(t)}{L_{bat}} k \begin{cases} k=1, & \text{if } d<0.5 \\ k=-1, & \text{if } d>0.5 \end{cases} \qquad \text{Eq. (2)}$$

where "d" denotes the duty cycle ratio.

Mode III

Figure 3C:
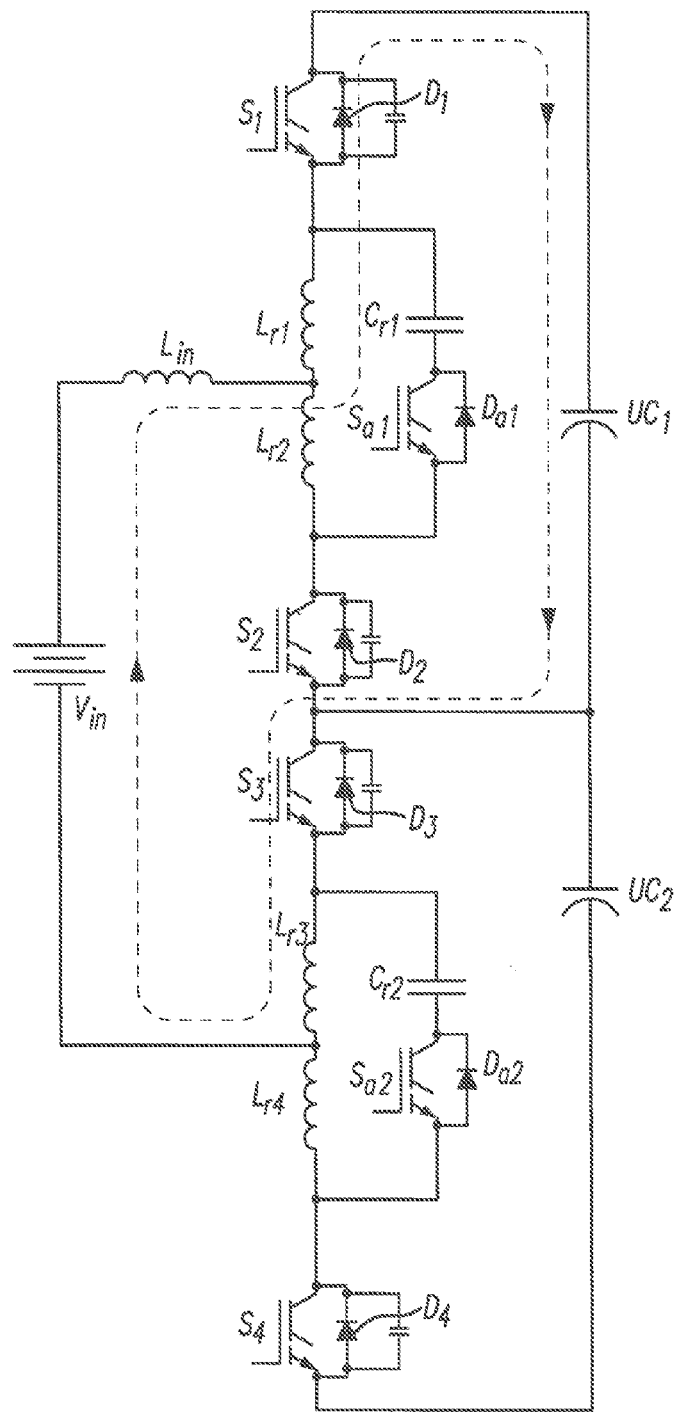

The equivalent circuit for the interval of the Mode III is presented in FIG. 3C. Similar to mode II, the mode III is applicable at any specified duty cycle value. In the Mode III, the main switch $S_3$ is ON (the switch is closed), while the main switch $S_2$ is OFF (the switch is opened).

In the topology, the capacitor $UC_1$ is charged by the current $i_{UC1}$ through the body diode $D_1$ of the main switch $S_1$. Depending on the duty cycle, the induction current $I_L$ decreases or increases as $$\frac{di_L(t)}{dt} = \frac{V_{bat}(t) - V_{UC1}(t)}{L_{bat}} k \begin{cases} k=1, & \text{if } d<0.5 \\ k=-1, & \text{if } d>0.5 \end{cases} \qquad \text{Eq. (3)}$$

Mode IV

Figure 3D:
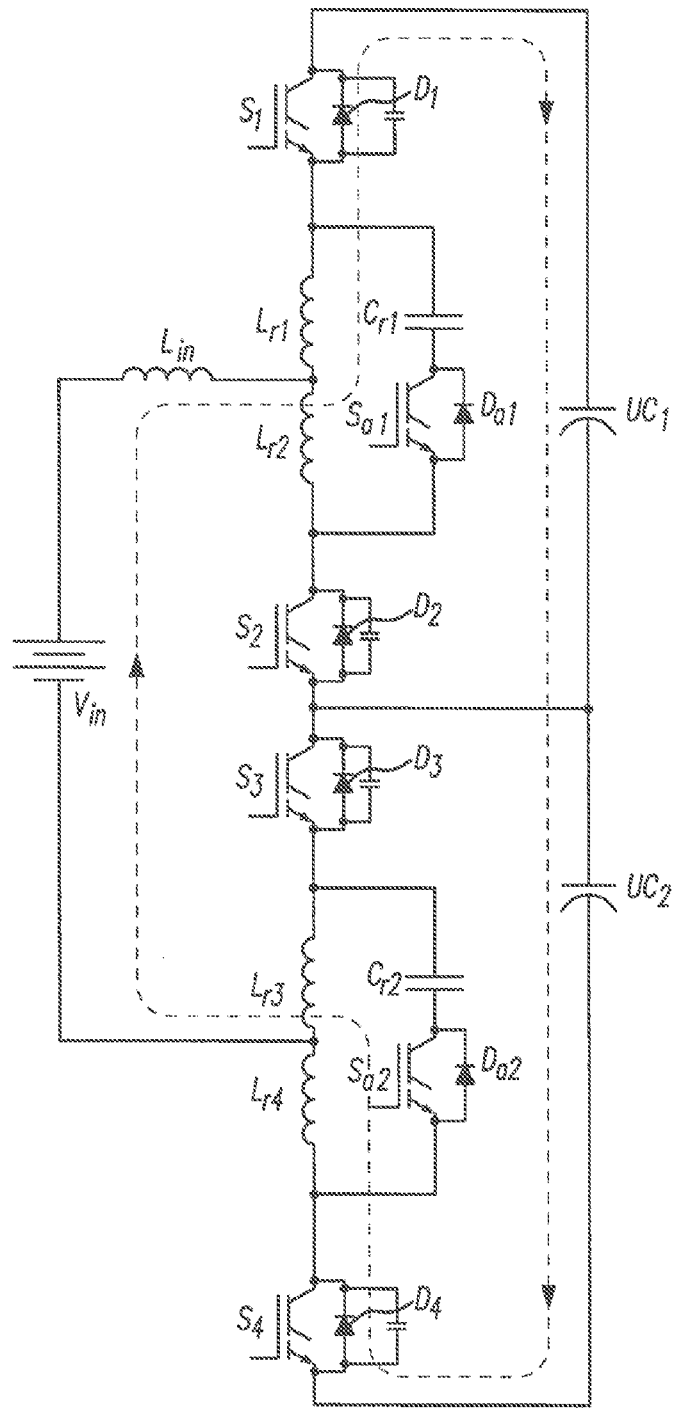

The equivalent circuit for the Mode IV is presented in FIG. 3D. In Mode IV, both main switches $S_2$ and $S_3$ are turned OFF (the switch is opened). The inductor current $I_L$ continues to charge the UC banks through the body diodes $D_1$ and $D_4$ of the main switches $S_1$ and $S_4$. The mode IV is used only when the duty cycle is lower than 0.5.

The voltage across the inductor 24 is the difference between the battery voltage $V_{bat}$ ($V_{in}$) and UC bank voltage $V_{uc}$. The inductor current $I_L$ decreases with a constant slope. The current variation of $I_L$ can be expressed as $$\frac{di_L(t)}{dt} = \frac{V_{UC}(t) - V_{bat}(t)}{L_{bat}} \qquad \text{Eq. (4)}$$

where $V_{UC}(t)$ is the sum of $V_{UC1}(t)$ and $V_{UC2}(t)$.

The climax value of the duty cycle is 0.5. Based on the duty cycle value (d<0.5 or d>0.5), the sequence of the equivalent circuits is separated into two categories. Basically, if the duty cycle is lower than 0.5, the sequence of equivalent circuits is Mode IV-Mode II-Mode IV-Mode III. This sequence of modes repeats itself during the DC/DC converter operation. During this sequence mode, mode I does not occur. Since the control signals of the main switch are displaced by 180° each with respect to another, as the duty cycle increases to over 0.5, the control signals $V_{tri1}$ and $V_{tri2}$ begin to overlap. This overlapping creates a new equivalent circuit sequence I-II-I-III, where the mode IV does not occur.

The control signal generation, operation waveforms and operation mode sequences are plotted in FIGS. 4A-4B, where FIG. 4A represents the waveforms when duty cycle is higher than 0.5. It is clearly seen that the effective input and output current ripple frequency is twice of the switching frequency.

The ratio of the output voltage to the input voltage can be found through analyzing the inductor current ripple. Using Eq. (3) which represents the inductor ripple when operating in mode I and equalizing it to Eq. (4) representing mode II, the voltage ratio can be derived as $$\frac{V_0}{V_{in}} = \frac{2}{1 - d_{eff}} \qquad \text{Eq. (5)}$$

where $V_0$ is the output voltage (also referred to herein as $V_{uc}$), and $V_{in}$ is the input voltage (also referred to herein as $V_{bat}$), and where $d_{eff}$ is $$d_{eff} = (d_{s2} - 0.5) + (d_{s3} - 0.5) \qquad \text{Eq. (6)}$$

where $d_{s2}$ is the duly cycle of the main switch $S_2$, and $d_{s3}$ is the duty cycle of the main switch $S_3$.

As previously presented, duty cycles of the switches in the circuitry are the same. Hence the effective duty cycle $\underline{d}_{eff}$ be rewritten as $$\underline{d}_{eff} = 2 \times (d - 0.5) \qquad \text{Eq. (7)}$$

The operation waveforms of the circuit in the boost mode with a duty cycle lower than 0.5 is shown in FIG. 4B.

The output to input voltage ratio is represented by Eq. 8.

$$\frac{V_0}{V_{in}} = \frac{2}{2 - d_{eff}} \qquad \text{Eq. (8)}$$

where the effective duty cycle for this mode is the sum of the individual duty cycles for the contributing main switches.

$$\underline{d}_{eff} = d_{s2} + d_{s3} = 2 \times d \qquad \text{Eq. (9)}$$

Each ZVS circuit 16, 20 contains two resonance inductors ($L_{r1}/L_{r2}$ or $L_{r3}/L_{r4}$), one resonance capacitor ($C_{r1}$ or $C_{r2}$), and an auxiliary switch ($S_{a1}$ or $S_{a2}$). The proposed ZVS circuits 16, 20 are capable of eliminating the turn-ON losses of one of the switches by creating a resonance between the inductor and capacitor. The ZVS circuit 16 is placed between the main switches $S_1$ and $S_2$ to soft switch a respective operating switch $S_1$ or $S_2$. The ZVS circuit 20 is placed between the main switches $S_3$ and $S_4$ to soft switch a respective operating switch $S_3$ or $S_4$.

In the boost mode of operation, only $S_2$ and $S_3$ are actively switched. Four different operation modes (Mode I-Mode IV) exist due to different combinations of switch states as presented supra. As presented in Table 1, the first ZVS circuit 16 is active in the boost mode of operation for soft switching of the main switch $S_2$ during transition from mode IV to mode II when duty cycle is lower than 0.5, and during transition from mode III to mode I when duty cycle is higher than 0.5. The first ZVS circuit 16 is also active in the buck mode of operation to soft switch the main switch $S_1$ during mode transition II-IV (for d>0.5), and mode transition I-III (for d<0.5). The second ZVS circuit 20 is active in the boost mode of operation to soft switch the main switch S3 during transition between modes II-I (d>0.5) and between modes IV-III (d<0.5). The ZVS circuit 20 is also active in the buck mode of operation to soft switch the main switch $S_4$ during transition between modes III-IV (d>0.5), and transition between modes I-II (d<0.5).

The energy stored in the resonance inductor during the normal operation, is transferred to the resonant capacitor when the main switch is turned OFF. This energy is then recycled to conduct the body diode of the main switch before it is turned ON.

The ZVS cell 20 (which is identical to the ZVS cell 16) is placed between the main switches $S_3$ and $S_4$ to soft switch the switches $S_3$, $S_4$. In the boost operation, only $S_2$ and $S_3$ are actively switched and four different stages exist due to different combination of switch states as explained in previous paragraphs.

The basic operation principles of the ZVS cell are identical in each mode transition in both boost and buck operations. The ZVS cell operation according to the operation modes, transition intervals, used resonant inductor, auxiliary switch and soft-switched IGBT, is summarized in Table I.

TABLE I

Summary of the ZVS Operation.

| | Transition Stages | Resonant Inductor | Auxiliary Switch | ZVS Switch |
|---|---|---|---|---|
| Boost mode d > 0.5 | III-I | $L_{r2}$ | $S_{a1}$ | $S_2$ |
| | II-I | $L_{r3}$ | $S_{a2}$ | $S_3$ |
| Boost mode d < 0.5 | IV-II | $L_{r2}$ | $S_{a1}$ | $S_2$ |
| | IV-III | $L_{r3}$ | $S_{a2}$ | $S_3$ |
| Buck mode d > 0.5 | III-IV | $L_{r4}$ | $S_{a2}$ | $S_4$ |
| | II-IV | $L_{r1}$ | $S_{a1}$ | $S_1$ |
| Buck mode d < 0.5 | I-II | $L_{r4}$ | $S_{a2}$ | $S_4$ |
| | I-III | $L_{r1}$ | $S_{a1}$ | $S_1$ |

As an example, the operation principles for the transition of modes I-III-I are presented infra.

The circuit waveforms and equivalent operation modes are presented in FIG. 5 and FIGS. 6A-6H.

Figure 6A:
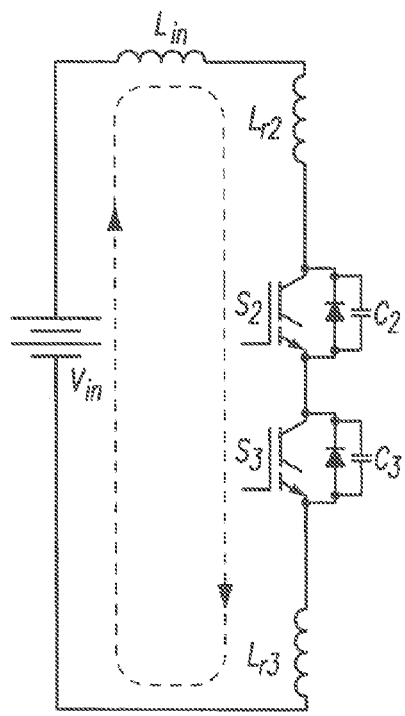
FIGS. 6A-6H represent equivalent circuits of ZVS operation during mode transitions I-III-I in the boost mode, where FIG. 6A corresponds to the operation interval $t<t_0$, FIG. 6B corresponds to the operation interval $t_0<t<t_1$, FIG. 6C corresponds to the operation interval $t_1<t<t_2$, FIG. 6D corresponds to the operation interval $t_2<t<t_3$, FIG. 6E corresponds to the operation interval $t_3<t<t_4$, FIG. 6F corresponds to the operation interval $t_4<t<t_5$, FIG. 6G corresponds to the operation interval $t_5<t<t_6$, and FIG. 6H corresponds to the operation interval $t_6<t<t_7$.

Operation Interval 1 [t<$t_0$] Presented in FIG. 6A

Before $t_0$, both $S_2$ and $S_3$ are ON, the transformer 24 ($L_{in}$) stores energy, and the DC/DC converter 10 operates in boost stage I of the TL (three level) converter. In this mode, $i_{Lr1}(t_0)$=0. In this case, the ON time of the auxiliary switch is equal to the quarter of the resonance, $v_{Cr1}(t_0)$=0. This will be explained in further paragraphs. The current of $L_{r2}$ is equal to $$i_{Lr2}(t) = i_{Lr2}(t_7) + \frac{V_{in}}{L_{in} + 2L_r} \quad \text{Eq. (10)}$$

This time interval is determined by the effective on-time duty ratio of the main switch $S_2$.

Figure 6B:
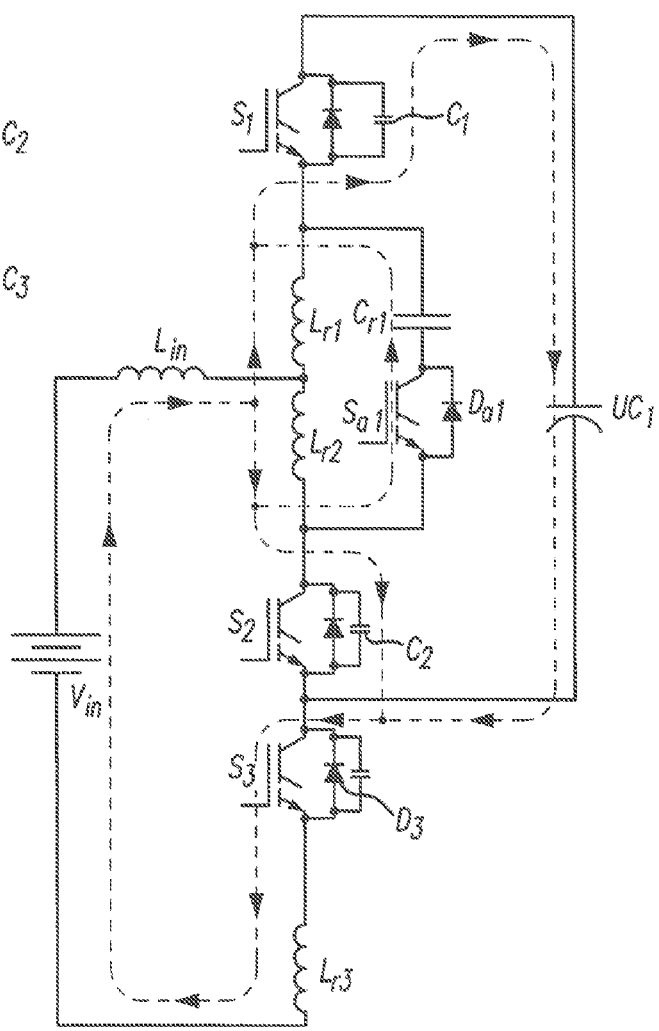

Operation Interval 2 [$t_0$<t<$t_1$] Presented in FIG. 6B

At t=$t_0$, the main switch $S_2$ is turned OFF. The current of $L_{r2}$ begins to resonate in the resonance tank through $L_{r1}$–$L_{r2}$–$C_{r1}$. The sum of the voltages of the inductors $v_{L1}+v_{L2}$ is equal to $v_{cr1}$. The parasitic capacitance $C_1$ of the main switch $S_1$, discharges over the output capacitor, and transfers its energy, while the parasitic capacitance $C_2$ of the main switch $S_2$ is charged as $v_{S1}(t_0)=V_0/2$, and $v_{S1}+v_{Cr1}+v_{S2}>V_0/2$.

The initial conditions can be noted as $$i_{Lr2}(t_0) = i_{Lr2}(t_7) + \frac{1}{2}\left(\frac{V_{in}}{L_{in} + 2L_r}\right) t_{70} \quad \text{Eq. (11)}$$

$$i_{Lr1}(t_0) = 0 \quad \text{Eq. (12)}$$

$$v_{Cr1}(t_0) = 0 \quad \text{Eq. (13)}$$

The natural frequency of the resonant tank is expressed as $$\omega = \frac{1}{\sqrt{2L_r C_{r1}}} \quad \text{Eq. (14)}$$

Figure 6C:
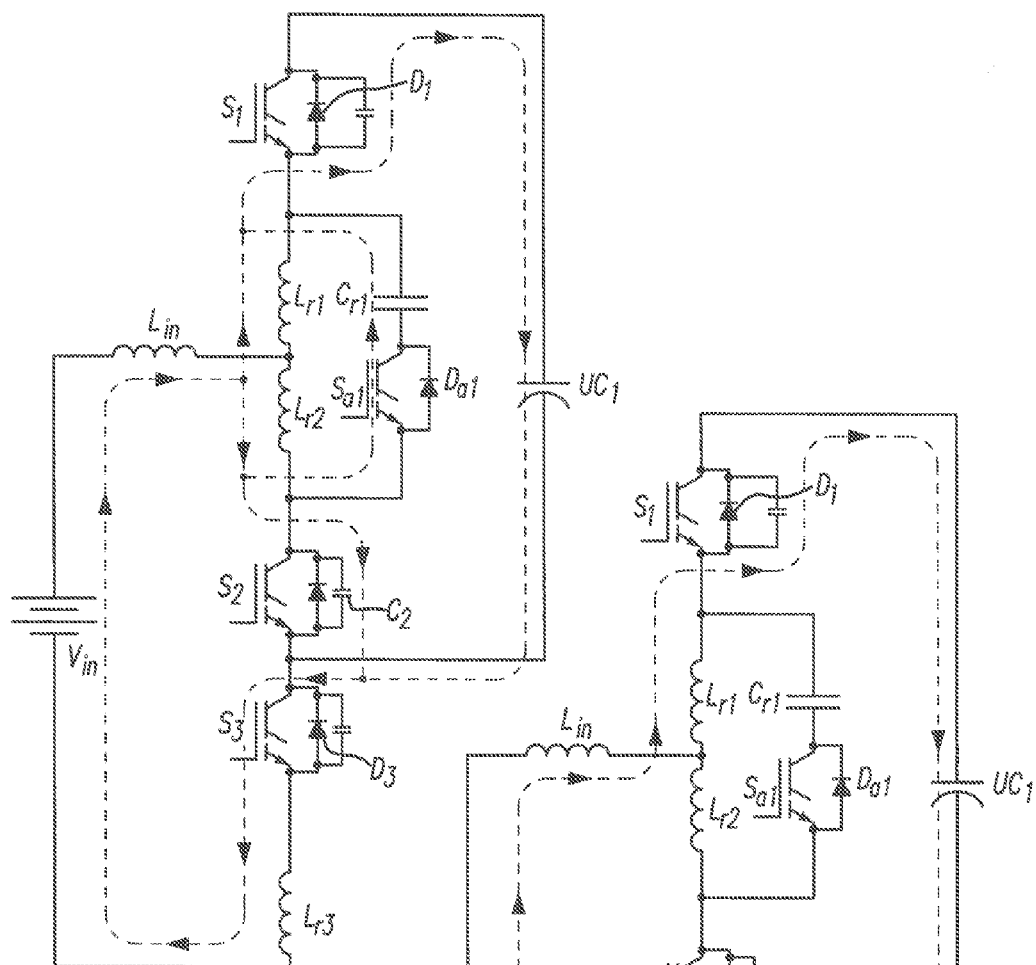

Operation Interval 3 [$t_1$<t<$t_2$] Presented in FIG. 6C

The parasitic capacitance $C_1$ is discharged completely at the end of operation interval 2, as current begins commutating from $L_{r2}$ to $L_{r1}$, and $D_1$ conducts. The parasitic capacitance $C_2$ continues to get charged. This interval occurs very quickly as $C_1$ is typically in the order of several hundreds of pF, and is not included in the calculations for simplicity.

The energy stored in $L_{r2}$ is transferred to the resonant capacitor $C_{r1}$ through the diode $D_{a1}$. For this interval, the resonant inductor currents can be expressed as $$i_{Lr2}(t) = i_{Lr2}(t_0)\cos(\omega t) \quad \text{Eq. (15)}$$

$$i_{Lr1}(t) = i_{Lr2}(t_0)(1-\cos(\omega t)) \quad \text{Eq. (16)}$$

The resonant capacitor voltage $V_{Cr1}$ can be written as $$v_{Cr1}(t) = \frac{i_{Lr2}(t_0)}{C_{r3}\omega} \sin(\omega t) \quad \text{Eq. (17)}$$

At t=$t_2$, $i_{Lr2}$ becomes zero as it transfers all its energy to the resonant capacitor $C_{r1}$.

$$i_{Lr2}(t_2) = 0 \quad \text{Eq. (18)}$$

From this final state condition, $t_{02}$ can be found as $$t_{02} = \frac{\pi}{2\omega} \quad \text{Eq. (19)}$$

Figure 6D:
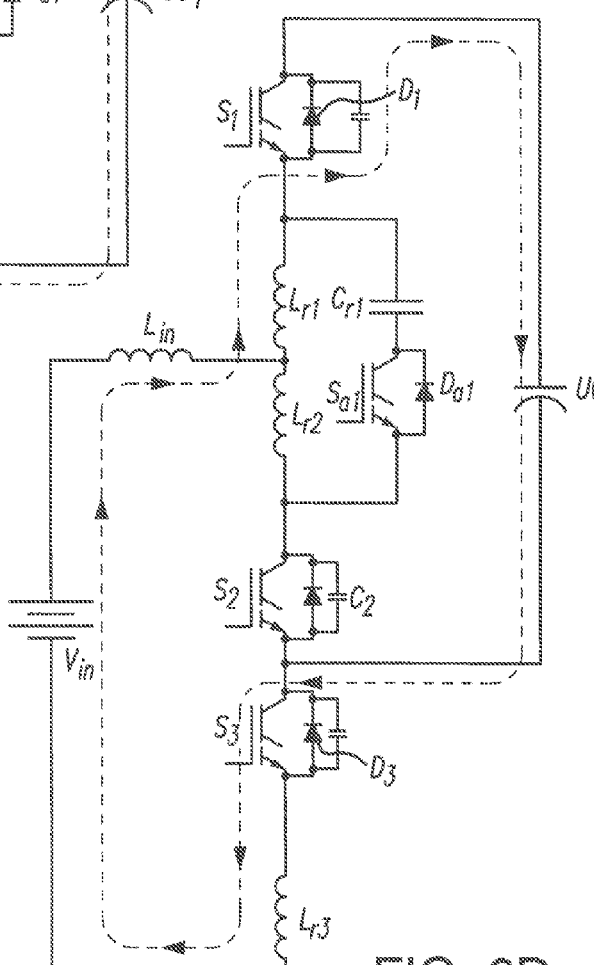

Operation Interval 4 [$t_2$<t<$t_3$] Presented in FIG. 6D

At t=$t_2$, the resonant inductor current $i_{Lr1}$ is the same as $i_{Lr2}(t_0)$. The resonant capacitor voltage $V_{Cr1}$ can be found from the energy transfer between $v_{cr1}$ and $i_{Lr2}$ as $$v_{Cr1}(t_2) = \sqrt{\frac{2L_r}{C_{r1}} i_{Lr2}^2(t_0)} \quad \text{Eq. (20)}$$

The energy stored in $C_{r1}$ will be used to achieve soft-switching at a latter stage. In this time interval, the converter transits from the mode I to mode III of regular operation modes. The resonant inductor current $i_{Lr1}$ can be written as $$i_{Lr2}(t) = i_{Lr1}(t_2) - \left(\frac{V_o/2 - V_{in}}{L_{in} + L_r}\right) t \quad \text{Eq. (21)}$$

Figures 6E, 6F:
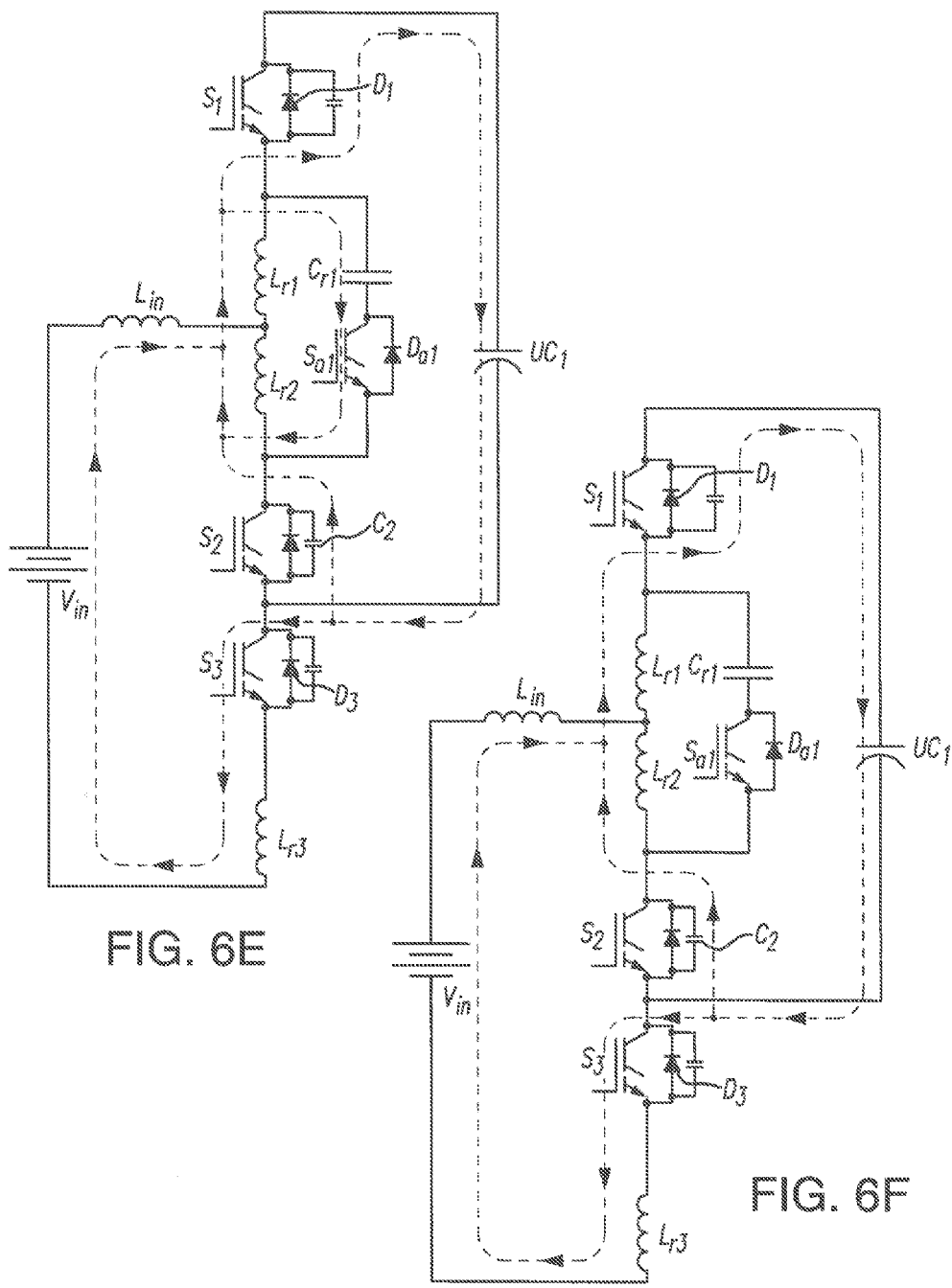

Operation Interval 5 [$t_3$<t<$t_4$] Presented in FIG. 6E

Before the main switch $S_2$ is turned ON, the auxiliary switch, $S_{a1}$, is turned ON to transfer the energy stored in the capacitor to the resonant inductor, $i_{Lr2}$. The auxiliary switch $S_{a1}$ is turned ON under zero-current. $V_{Lr2}$ is half of the $V_{Cr1}$ and $i_{Lr2}$ increases in a sinusoidal shape. The parasitic capacitance $C_2$ is first quickly charged to $V_{Cr1}+V_o/2$, then is discharged as $v_{cr1}$ decreases.

At t–$t_3$, the initial conditions are as follows:

$$i_{Lr2}(t_3)=0, v_{cr1}(t_3)=v_{cr1}(t_2).$$

In this interval, the resonant inductor currents $I_{Lr}$ and capacitor voltage $V_{cr}$ are $$v_{Cr1}(t) = v_{Cr1}(t_3)\cos(\omega t) \quad \text{Eq. (22)}$$

$$i_{Lr2}(t) = -C_r v_{Cr1}(t_3)\omega\sin(\omega t) \quad \text{Eq. (23)}$$

$$i_{Lr1}(t) = i_{Lr1}(t_3) + C_r v_{Cr1}(t_3)\omega\sin(\omega t) \quad \text{Eq. (24)}$$

$$t_{34} = \frac{\pi}{2\omega} \quad \text{Eq. (25)}$$

At the end of this mode, $V_{Cr1}$ is equal to that of at $t=t_0$, $v_{Cr1}(t_4)=v_{Cr1}(t_0)=0$.

At $t=t_5$, the current of the body diode $D_1$ increases to approximately twice of the load current.

Operation Interval 6 [$t_4$<t<$t_5$] Presented in FIG. 6F

When the energy stored in the resonant capacitor $C_{r1}$ is completely transferred via $S_{a1}$, the auxiliary switch $S_{a1}$ is turned OFF under zero voltage. Subsequently, the parasitic capacitance $C_2$ quickly discharges to zero. This time interval can be expressed as $$t_{45} = \frac{2L_r\left(i_{Lr2}(t_4) - \sqrt{i_{Lr2}(t_4)^2 - \frac{C_{oss2}V_o^2}{2L_r}}\right)}{V_o} \quad \text{Eq. (26)}$$

where $C_{oss2}$ corresponds to the capacitance of the parasitic capacitance $C_2$.

Figures 6G, 6H:
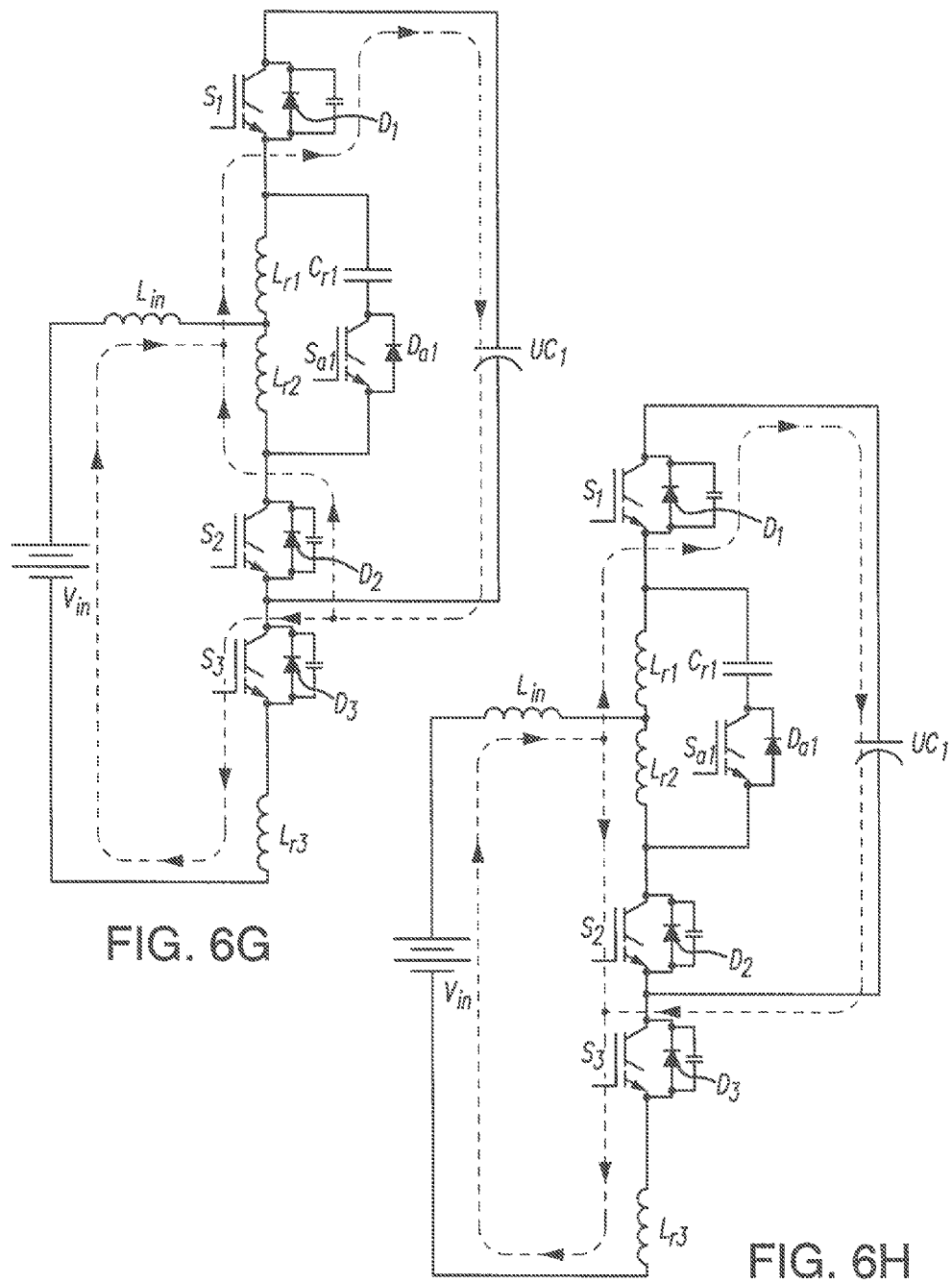

Operation Interval 7 [$t_5$<t<$t_6$] Presented in FIG. 6G

When $v_{S2}$ reaches –0.7V, the body diode $D_2$ of the main switch $S_2$ conducts. This time period is the ZVS period. The main switch $S_2$ can be turned ON at any time during this interval.

At $t=t_5$, the initial conditions are $$i_{Lr2}(t_5) = -\sqrt{\frac{C_{r1}v_{Cr1}^2(t_2)}{2L_r}} \quad \text{Eq. (27)}$$

$$i_{Lr1}(t_5) = i_{Lr1}(t_4) + C_{r1}v_{Cr1}(t_4)\omega\sin(\omega t_4) \quad \text{Eq. (28)}$$

$v_{Lr2}$ is equal to $V_o/4$, and $i_{Lr2}$ decreases linearly.

$$i_{Lr2}(t) = i_{Lr2}(t_5) + \frac{V_o}{4L_r}t \quad \text{Eq. (29)}$$

$$i_{Lr1}(t) = i_{Lr1}(t_5) - \frac{V_o}{4L_r}t \quad \text{Eq. (30)}$$

At $t=t_6$, the main switch $S_2$ is turned ON, while its body diode $D_2$ is conducting. The zero-voltage-switching can be achieved at this instant. With the assumption of $t_{45} \ll i_{56}$, $t_{46} \cong t_{56}$, the ZVS time interval can be expressed as $$t_{56} = \frac{4L_r(i_{Lr2}(t_6) - i_{Lr2}(t_3))}{V_o} \quad \text{Eq. (31)}$$

Operation Interval 8 [$t_6$<t<$t_7$] Presented in FIG. 6H

This interval starts after the main switch $S_2$ is turned ON. First, the current of the body diode $D_2$ of the main switch $S_2$ reaches zero. In this time interval, the main switch $S_2$ begins to conduct current, and input current commutes from $L_{r1}$ to $L_{r2}$.

At $t=t_6$, $i_{Lr1}$ is $$i_{Lr1}(t_6) = i_{Lr1}(t_5) - \frac{V_o}{4L_r}t_{56} \quad \text{Eq. (32)}$$

The resonant inductor currents for this interval can be expressed as $$i_{Lr1}(t) = i_{Lr1}(t_6) - \frac{V_o}{4L_r}t \quad \text{Eq. (33)}$$

$$i_{Lr2}(t) = i_{Lr2}(t_6) + \frac{V_o}{4L_r}t \quad \text{Eq. (34)}$$

At $t=t_7$, the input current commutation from $L_{r1}$ to $L_{r2}$ is completed, and $i_{Lr1}$ becomes zero. This time interval can be expressed as $$i_{Lr1} = \frac{4L_r(i_{Lr2}(t_7) - i_{Lr2}(t_6))}{V_o} \quad \text{Eq. (35)}$$

The topology of the DC/DC converter 10 has a number of advantages for high voltage/high power UC hybrid systems:

1. The proposed ZVS circuits 16 and 20 eliminate the turn-ON switch losses of all switches, e.g., main switches $S_1$-$S_4$ and auxiliary switches $S_{a1}$-$S_{a2}$, at any operation mode. Owing to the halved switching losses, the switching frequency can be increased to 250 kHz without adding significant heat sink to the system. In this case, the doubled system frequency would be 500 kHz.

2. Without the ZVS soft-switching, the DC/DC converter frequency may be in the range of up to 300-400 kHz. Accordingly, without soft switching, the switching frequency of the SiC semiconductors (the IGBTs switches) is limited to approximately 150-200 kHz.

The switching losses of the IGBT switches are expressed as $$P_{IGBT\_switch}=(E_{ON}+E_{OFF})\times fs, \quad \text{Eq. (36)}$$

where fs is a switching frequency, and $E_{ON}$ and $E_{OFF}$ are the switching losses during the switching ON and switching OFF, respectively.

It is clear that the switching losses are a function of the switching frequency. The effective frequency in the present system is twice of the switching frequency of the power switches. Therefore, the transfer inductor size (which is the biggest component compared to the semiconductor devices) can be reduced due to the doubled system frequency.

In addition, the current ripple of the transfer inductor 24 is significantly smaller than that in conventional topologies. Preliminary analysis shows that the size of the inductor may be reduced four times in comparison to two level boost converter when the same current ripple is targeted and same system frequency is adopted.

3. The voltage ratings of the switches are half of a two-level converter. The lower voltage rated switches are typically faster and have lower internal resistance, which contribute to the higher efficiency. Similarly, the anti-parallel diodes of the switches will be faster and the reverse recovery losses would be lower.

4. As a part of the converter operation, two split DC link capacitors UC1 and UC2 are used. In the proposed configuration, the UC is located at the high voltage side and can be split into two UC banks to replace the DC link capacitors. Thereby, the DC link capacitors may be eliminated on the UC side.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A DC/DC convertor for converting voltage between a battery and a DC link in Hybrid Electric vehicles, comprising:
   main switches $S_1$, $S_2$, $S_3$ and $S_4$ coupled to opposite first and second terminals of a battery, wherein said main switches $S_1$ and $S_2$ are coupled to said first terminal, said main switches $S_3$ and $S_4$ are coupled to said second terminal, and said main switches $S_2$ and $S_3$ are further coupled each to the other,
   a first zero-voltage-switching (ZVS) circuit coupled to said first terminal of the battery between said main switches $S_1$ and $S_2$, and functioning to substantially eliminate switching losses in main switches $S_1$ and $S_2$, thereby attaining an increased switching frequency for said main switches $S_1$ and $S_2$,
   a second zero-voltage-switching (ZVS) circuit coupled to said second terminal of the battery between said main switches $S_3$ and $S_4$, and functioning to substantially eliminate switching losses in main switches $S_3$ and $S_4$, thereby attaining an increased switching frequency for said main switches $S_3$ and $S_4$, wherein each said main switches $S_1$-$S_4$ includes a solid state switch,
   a transfer inductor coupled between said first terminal of said battery and said first ZVS circuit,
   an ultracapacitor bank split in two bank capacitors $UC_1$ and $UC_2$ functioning as DC link capacitors, wherein said bank capacitor $UC_1$ is connected between said main switch $S_1$ and a connection node of said main switches $S_2$ and $S_3$, and wherein said bank capacitor $UC_2$ is connected between said main switch $S_4$ and said connection node of said main switches $S_2$ and $S_3$, and
   a controller supplying control signals $V_{tri1}$ to said main switches $S_1$, and $S_2$, and $V_{tri2}$ to said main switches $S_3$, and $S_4$ to control switching of respective ones of said main switches $S_1$-$S_4$ in a predetermined order depending on a required mode of operation to attain efficient three level DC/DC voltage conversion with decreased switching losses and reduced current ripple on said transfer inductor.

2. The DC/DC converter of claim 1, operating bi-directionally in a mode of operation selected from a group including:
   (a) a boost mode, where the power flow is directed from the battery to the DC Link, and
   (b) a buck mode, where the energy flow is directed from the DC Link to the battery.

3. The DC/DC converter of claim 2, wherein in said boost mode of operation, said main switches $S_2$ and $S_3$ are pulse-width-modulated, and said main switches $S_1$ and $S_4$ are switched OFF.

4. The DC/DC converter of claim 3, wherein in said buck mode of operation, said main switches $S_1$ and $S_4$ are pulse-width modulated, and said main switches $S_2$ and $S_3$ are switched OFF.

5. The DC/DC converter of claim 4, wherein during said boost and buck modes of operation, said DC/DC converter operates through a repetition of a predetermined sequence of modes selected from a group including:
   mode I, wherein said main switches $S_2$ and $S_3$ are switched ON for said boost mode, and said main switches $S_1$ and $S_4$ are switched ON for said buck mode;
   mode II, wherein for said boost mode, said main switch $S_2$ is switched ON, and said main switch $S_3$ is switched OFF, and for said buck mode, said main switch $S_1$ is switched ON, and said main switch $S_4$ is switched OFF;
   mode III, wherein for said boost mode, said main switch $S_2$ is switched OFF, and said main switch $S_3$ is switched ON, and for said buck mode, said main switch $S_1$ is switched OFF, and said main switch $S_4$ is switched ON; and
   mode IV, wherein said main switches $S_2$ and $S_3$ are switched OFF for said boost mode, and said main switches $S_1$ and $S_4$ are switched OFF for said buck mode.

6. The DC/DC converter of claim 5, wherein each of said first and second ZVS circuits includes a pair of coupled in sequence resonance inductors, and a resonance capacitor coupled in sequence with an auxiliary switch, wherein each of said pairs of resonance inductors are coupled in parallel to a respective series circuit of said resonance capacitor and said auxiliary switch,
   wherein said first ZVS circuit is active during soft switching of either of said main switches $S_1$ and $S_2$, and wherein said second ZVS circuit is active during soft switching of either of said main switches $S_3$ and $S_4$,
   wherein said first ZVS circuit is active in the boost mode of operation during transition from said mode IV to said mode II when the duty cycle d<0.5, and during transition from said mode III to said mode I when said duty cycle d>0.5,
   wherein said first ZVS circuit is active in said buck mode of operation during transition between said modes II-IV when d>0.5, and during transition between said modes I-III when d<0.5,
   wherein said second ZVS circuit is active in the boost mode of operation during transition between said modes II-I when d>0.5, and during transition between modes IV-III when d<0.5, and
   wherein said second ZVS circuit is active in the buck mode of operation during transition between said modes III-IV when d>0.5, and during transition between said modes I-II when d<0.5.

7. The DC/DC converter of claim 6, wherein said auxiliary switch is switched ON in zero-current-switched (ZCS) mode, and switched OFF in ZVS mode.

8. The DC/DC converter of claim 5, wherein, when a duty cycle d of said DC/DC converter is d<0.5, said main switches $S_2$ and $S_3$ are controlled in said boost mode of operation, to perform repetitions of a predetermined sequence of said modes, including mode IV-mode II-mode IV-mode III, and said main switches $S_1$ and $S_4$ are controlled in said buck mode of operation to perform repetitions of a predetermined sequence of said modes including mode I-mode II-mode I-mode III.

9. The DC/DC converter of claim 5, wherein, when a duty cycle d of said DC/DC converter exceeds 0.5, said main switches $S_2$ and $S_3$ are controlled in said boost mode of operation to perform repetitions of a predetermined sequence of said modes, including mode I-mode II-mode I-mode III, and said main switches $S_1$ and $S_4$ are controlled in said buck mode of operation to perform repetitions of a predetermined sequence of said modes including mode III-mode IV-mode II-mode IV.

10. The DC/DC converter of claim 1, wherein said control signals $V_{tri1}$ and $V_{tri2}$ have 180° phase shift with respect each to the other.

11. The DC/DC converter of claim 1, wherein a switching frequency of a corresponding one of said main switches $S_1$, $S_2$, $S_3$, $S_4$ is controlled in accordance with a period of a respective one of said control signals $V_{tri1}$ and $V_{tri2}$,
  wherein said corresponding main switch is turned ON when a value of a duty cycle of said corresponding main switch exceeds an amplitude of said respective control signal, and
  wherein the turn-on time of said corresponding main switch is phase-shifted, resulting in an effective frequency of said DC/DC converter twice as high as said switching frequency.

12. A method of a bi-directional DC/DC voltage converting between a battery voltage and a DC Link voltage in Hybrid Electric Vehicles, comprising the steps of:
  forming a DC/DC converter and coupling said DC/DC converter between a battery and a DC Link, wherein said DC/DC converter is formed by:
  coupling main switches $S_1$, $S_2$, $S_3$, $S_4$ each to a first and a second opposite terminals of the battery, wherein said main switches $S_1$ and $S_2$ are coupled to said first terminal, and said main switches $S_3$ and $S_4$ are coupled to said second terminal,
  coupling a first zero-voltage-switching (ZVS) circuit to said first terminal of the battery between said main switches $S_1$ and $S_2$, said first ZVS circuit operating to substantially eliminate switching losses of said main switches $S_1$ and $S_2$,
  coupling a second zero-voltage-switching (ZVS) circuit to said second terminal of the battery between said main switches $S_3$ and $S_4$, said second ZVS circuit operating to substantially eliminate switching losses of said main switches $S_3$ and $S_4$,
  connecting a transfer inductor between said first terminal of the battery and said first ZVS circuit,
  coupling an ultracapacitor bank split into two bank capacitors $UC_1$ and $UC_2$ between said main switches $S_1$ and $S_4$, wherein said bank capacitor $UC_1$ is connected between said main switch $S_1$ and a connection node of said main switches $S_2$ and $S_3$, and wherein said bank capacitor $UC_2$ is connected between said main switch $S_4$ and said connection node of said main switches $S_2$ and $S_3$, and
  controlling the switching of respective of said main switches $S_1$-$S_4$ by supplying thereto control signals $V_{tri1}$ and $V_{tri2}$ in a predetermined order, thereby switching said DC/DC converter between required modes of operation to attain efficient three level DC/DC voltage conversion with decreased switching losses and reduced current ripple in said transfer inductor.

13. The method of claim 12, wherein said control signals $V_{tri1}$ and $V_{tri2}$ are 180° phase shifted each with respect to the other, further comprising the steps of:
  supplying said control signal $V_{tri1}$ to a respective one of said main switches $S_1$ and $S_2$,
  supplying said control signal $V_{tri2}$ to a respective one of said main switches $S_3$ and $S_4$,
  controlling a switching frequency of a corresponding one of said main switches $S_1$, $S_2$, $S_3$, and $S_4$ in accordance with a period of said control signals $V_{tri1}$ and $V_{tri2}$, and
  phase-shifting the turn-on time of said corresponding main switch, thereby attaining an effective frequency of said DC/DC converter twice as high as said switching frequency.

14. The method of claim 12, further comprising the steps of:
  operating said DC/DC converter bi-directionally in a mode of operation selected from a group including a boost mode of operation and a buck mode of operation, wherein in said boost mode of operation, the power flow is directed from the battery to the DC Link, and wherein in said buck mode of operation, the power flow is directed from the DC Link to the battery,
  pulse-width-modulating said main switches $S_2$ and $S_3$ and switching OFF said main switches $S_1$ and $S_4$ in said boost mode of operation, and
  switching OFF said main switches $S_2$ and $S_3$ and pulse-width-modulating said main switches $S_1$ and $S_4$ in said buck mode of operation.

15. The method of claim 14, further comprising the steps of:
  operating said DC/DC converter by actuating repetitions of a predetermined sequence of modes including modes selected from a group including:
  mode I, wherein said main switches $S_2$ and $S_3$ are switched ON for said boost mode, and said main switches $S_1$ and $S_4$ are switched ON for said buck mode,
  mode II, wherein for said boost mode, said main switch $S_2$ is switched ON, and said main switch $S_3$ is switched OFF, and for said buck mode, said main switch $S_1$ is switched ON, and said main switch $S_4$ is switched OFF,
  mode III, wherein for said boost mode, said main switch $S_2$ is switched OFF, and said main switch $S_3$ is switched ON, and for said buck mode, said main switch $S_1$ is switched OFF, and said main switch $S_4$ is switched ON, and
  mode IV, wherein said main switches $S_2$ and $S_3$ are switched OFF for said boost mode, and said main switches $S_1$ and $S_4$ are switched OFF for said buck mode.

16. The method of claim 15, further comprising the steps of:
  activating said first and second ZVS circuits during soft switching of said main switches $S_2$ and $S_3$, respectively, to attain switching between said mode II and said mode IV, when the duty cycle d<0.5, and during soft switching of said main switches $S_2$ and $S_3$, respectively, to attain switching between said mode I and said mode III, when said duty cycle d<0.5.

17. The method of claim 15, further comprising the steps of:
  when a duty cycle d of said DC/DC converter d<0.5, switching said main switches $S_2$ and $S_3$ in said boost mode of operation to attain repetitions of a predetermined sequence of said modes, including mode IV-mode II-mode IV-mode III, and switching said main switches $S_1$ and $S_4$ in said buck mode of operation to perform repetitions of a predetermined sequence of said modes, including mode I-mode II-mode I-mode III.

18. The method of claim 15, further comprising the steps of:

when a duty cycle d of said DC/DC converter d<0.5, switching said main switches $S_2$ and $S_3$ in said boost mode of operation to perform repetitions of a predetermined sequence of said modes, including mode I-mode II-mode I-mode III, and switching said main switches $S_1$ and $S_4$ in said buck mode of operation to perform repetitions of a predetermined sequence of said modes, including mode III-mode IV-mode II-mode IV.

* * * * *